US007252771B2

United States Patent
Kopinke et al.

(10) Patent No.: US 7,252,771 B2
(45) Date of Patent: Aug. 7, 2007

(54) METHOD AND DEVICE FOR DECONTAMINATING WATERS WHICH ARE LOADED WITH ORGANIC HALOGEN COMPOUNDS (HALOGENATED HYDROCARBONS)

(75) Inventors: Franz-Dieter Kopinke, Leipzig (DE); Katrin MacKenzie, Naunhof (DE); Robert Koehler, Leipzig (DE); Holger Weiss, Bahlsdorf (DE); Peter Grathwohl, Tuebingen (DE); Christoph Schueth, Tuebingen (DE)

(73) Assignee: Helmholtz-Zentrum fur Umweltforschung GmbH-Ufz, Leipzig (DE)

( * ) Notice: Subject to any disclaimer, the term of this patent is extended or adjusted under 35 U.S.C. 154(b) by 348 days.

(21) Appl. No.: 10/483,683

(22) PCT Filed: Jul. 12, 2002

(86) PCT No.: PCT/EP02/07826

§ 371 (c)(1),
(2), (4) Date: May 27, 2004

(87) PCT Pub. No.: WO03/006379

PCT Pub. Date: Jan. 23, 2003

(65) Prior Publication Data
US 2004/0195189 A1    Oct. 7, 2004

(30) Foreign Application Priority Data
Jul. 13, 2001  (DE) .............................. 101 33 609

(51) Int. Cl.
C02F 1/20     (2006.01)
A62D 3/34     (2006.01)
B01D 71/10    (2006.01)

(52) U.S. Cl. .............. 210/750; 210/202; 210/255; 210/266; 210/753; 210/755; 210/908; 588/316; 588/406

(58) Field of Classification Search ............ 588/206, 588/207, 316, 406; 210/668, 749, 750, 763, 210/688, 908, 202, 255, 266, 753, 755
See application file for complete search history.

(56) References Cited

U.S. PATENT DOCUMENTS 3,892,818 A * 7/1975 Scharfe et al. ............ 423/481

(Continued)

FOREIGN PATENT DOCUMENTS

DE     43 09 469 A1   9/1994

(Continued)

OTHER PUBLICATIONS

A. Kowalzik and K. Pilchowski, "Investigations of the Adsorptive Separation of Volatile Chlorinated Hydrocarbons (VCHC) from Water with Humic Substance by Novel Polymeric Adsorbents and Activated Carbons. Part I: Isotherms and Kinetics of Adsorption".

(Continued)

*Primary Examiner*—Wayne A. Langel
*Assistant Examiner*—James Fiorito
(74) *Attorney, Agent, or Firm*—Akerman Senterfitt

(57) ABSTRACT

The invention relates to a process and a device for decontaminating waters, especially groundwaters, which are heavily and complexly polluted with organic halogen compounds (HHC), in which process the contaminated waters are pre-treated in order to convert low-volatility HHC into more readily volatile components, the halogenated hydrocarbons are subsequently transferred from the aqueous phase to the gaseous phase where complete conversion into halogen-free compounds takes place at elevated temperature by means of catalytic reductive dehalogenation.

20 Claims, 1 Drawing Sheet

U.S. PATENT DOCUMENTS

| | | | |
|---|---|---|---|
| 5,447,702 A * | 9/1995 | Campbell et al. | 423/230 |
| 5,490,941 A | 2/1996 | Miyabe et al. | |
| 5,531,901 A | 7/1996 | Miyabe et al. | |
| 5,562,834 A | 10/1996 | Bremer et al. | |

FOREIGN PATENT DOCUMENTS

| | | |
|---|---|---|
| DE | 197 43 109 A1 | 4/1999 |
| EP | 0 933 333 A1 | 8/1999 |
| JP | 03033191 A | 2/1991 |
| WO | WO 94/21563 A1 | 9/1994 |
| WO | WO 00/63125 A2 | 10/2000 |

OTHER PUBLICATIONS

T. Bigg and S.J. Judd, "Zero-Valent Iron for Water Treatment".

James Farrell et al., "Investigation of the Long-Term Performance of Zero-Valent Iron for Reductive Dechlorination of Trichloroethylene".

Robert W. Gillham and Stephanie F. O'Hannesin, Enhanced Degradation of Halogenated Aliphatics by Zero-Valent Iron.

Walt A. McNab Jr. and Roberto Ruiz, "In-Situ Destruction of Chlorinated Hydrocarbons in Groundwater Using Catalytic Reductive Dehalogenation in a Reactive Well: Testing and Operational Experiences".

Yurii I. Matatov-Meytal and Moshe Sheintuch, "Catalytic Abatement of Water Pollutants".

André J. Lecloux, "Chemical, Biological and Physical Constrains in Catalytic Reduction Processes for Purification of Drinking Water".

Christoph Schüth and Martin Reinhard, "Hydrodechlorination and Hydrogenation of Aromatic Compounds Over Palladium on Alumina in Hyrdogen-Saturated Water".

Lalith S. Vadlamannati, "Dechlorination of 1,2-Dichloroethane Catalyzed by Pt-Cu/C: Unraveling the Role of Each Metal".

Subodh Deshmukh and Julie L. d'Itri, "Transient Kinetics Investigations of Reaction Intermediates Involved in $CF_2Clc$ Hydrodechlorination".

Yurii Matatov-Meytal and Moshe Sheintuch, "Catalytic Regeneration of Chloroorganics-Saturated Activated Carbon Using Hydrochlorination".

Eun-Jae Shin and Mark A. Keane, "Gas-Phase Hydrochlorination of Pantachchlorophenol Over Supported Nickel Catalysts".

Claudia Menini, "Catalytic Hydrodehalogenation as a Toxification Methodology".

Michelle M. Scherer, "Correlation Analysis of Rate Constants for Dechlorination by Zero-Valent Iron".

Timothy L. Johnson, "Kinetics of Halogenated Organic Compound Degradation by Iron Metal".

William A. Arnold, :Polychlorinated Ethane Reaction with Zero-Valent Zinc: Pathways and Rate Control.

L. J. Matheson et al., "Reductive Dehalogenation of Chlorinated Methanes by Iron Metal".

Arturo A. Keller et al., "Hydrophobic Hollow Fiber Membranes for Treating MTBE-Contaminated Water".

* cited by examiner $p \leq 0.1$ MPa

METHOD AND DEVICE FOR DECONTAMINATING WATERS WHICH ARE LOADED WITH ORGANIC HALOGEN COMPOUNDS (HALOGENATED HYDROCARBONS)

CROSS REFERENCE TO RELATED APPLICATION

This application is a national stage of PCT/EP02/07826 filed Jul. 12, 2002, and based upon DE 101 33 609.8 filed Jul. 13, 2001 under the International Convention.

FIELD OF THE INVENTION

The invention relates to a process and a device for the decontamination of waters, especially groundwaters, which are heavily and complexly polluted with organic halogen compounds (halogenated hydrocarbons, HHC). According to the invention, the HHC in the contaminated waters are pre-treated and subsequently transferred to the gaseous phase. This is followed by reductive dehalogenation with hydrogen at elevated temperatures, using a catalyst. To this end, a catalyst based on elements of subgroup VIII of the periodic system of the elements (PSE) is preferably used. The water to be treated can be groundwater or wastewater from industrial and commercial plants.

DESCRIPTION OF THE RELATED ART

State of the art in the purification of waters polluted with organic compounds is adsorption on activated carbon or on adsorbent polymers [e.g. A. Kowalzik, K. Pilchowski, Acta Hydrochim. Hydrobiol. 27 (1999) 70-86 and 437-445]. These processes represent a high level of development. However, they merely result in initial relocation of the pollutants rather than destruction thereof. In addition, they have only limited adsorptive capacity for a number of polar or low-molecular weight compounds such as methyl tert-butyl ether (MTBE) or vinyl chloride (VC), which is why the corresponding processes operate with poor efficiency.

The state of the art also includes stripping processes wherein volatile organic compounds are stripped from the aqueous phase with air [P. Pratner, in: Möglichkeiten und Grenzen der Reinigung kontaminierter Grundwässer, DECHEMA 1997, ISBN 926959-80-0, pp. 287-298]. The stream of exhaust air thus produced is usually purified using adsorption or catalytic oxidation. Basically, oxidation of HHC involves the risk of forming highly toxic byproducts such as polychlorinated dibenzodioxins and -furans (PCDD/F). These processes are disadvantageous in that only volatile compounds are removed and that the water to be purified comes in contact with atmospheric oxygen, resulting in possible precipitation of iron and manganese compounds which give rise to rapid blocking of the stripping columns.

A modern alternative for passive purification of CHC-contaminated groundwaters is represented by iron walls or reactors filled with iron [T. Bigg, S. J. Judd, Environ. Technol. 21 (2000), 661-670; J. Farrell, M. Kason, N. Melitas, T. Li, Environ. Sci. Technol. 34 (2000), 514-521], wherein the groundwater to be purified passes through a fixed bed of granular, metallic iron, resulting in reductive dechlorination of the CHC according to the reaction equation $R-Cl+Fe^0+H_2O \rightarrow R-H+Fe^{2+}+OH^-+Cl^-$. This heterogeneous chemical reaction involves the drawback of low reaction rates for many HHC (in the event of VC, for example, a half-life of 12.5 hours at an available iron surface area of 1000 m$^2$ per liter of water to be treated [R. W. Gillham, S. F. O'Hannesin, Ground Water 32 (1994), 958-967]). Polychlorinated compounds either react in one go to form hydrocarbons free of chlorine or undergo dechlorination in stages. Starting with e.g. trichloroethene (TCE), the partially dechlorinated products cis-dichloroethene (cis-DCE) and VC are formed in addition to ethene and ethane. The design of a fixed bed reactor with iron packing depends on the contaminant with the slowest reaction. In the example mentioned above, the reaction of the intermediate products cis-DCE and VC is much slower than that of the original TCE contaminant. Long residence times and thus, large reactors are required for largely complete conversion (>five half-lives). Such a design can make sense in those cases where iron reactors are built on-site in a contaminated groundwater aquifer and are passed by a slowly flowing stream of groundwater, e.g. in the form of permeable reaction walls or as funnel-and-gate constructions. However, extremely large reactors are less suitable for ex situ plants with high flow rates. In addition, the chemical reaction between iron and HHC fails completely for a number of HHC of environmental relevance, e.g. methylene chloride, chlorinated benzenes, phenols and biphenyls.

Another way of converting HHC is catalytic hydrodehalogenation with hydrogen as reducing agent according to the reaction equation $R-Cl + H_2 \rightarrow R-H+HCl$ [W. W. McNab, R. Ruiz, M. Reinhard, Environ. Sci. Technol. 34 (2000), 149-153]. This reaction proceeds only on those catalysts which are capable of effecting chemical activation of molecular hydrogen, e.g. Pd, Ru, Ni, etc. [Y. I. Matatov-Meytal, M. Sheintuch, Ind. Eng. Chem. Res. 37 (1998), 309-326]. The use of metal catalysts in the purification of heavily contaminated waters, in particular, involves a number of problems. The main problem is rapid deactivation of the catalyst, so that a service life of from months to years required for technical use is far from being achieved [A. J. Lecloux, Catalysis Today 53 (1999), 23-34]. One of the reasons for deactivation is the presence or formation of sulfur compounds (sulfide or organic sulfur compounds) frequently present as minor components in anaerobic, heavily contaminated waters. However, formation of sulfide may also proceed in situ as a result of microbial sulfate reduction in the presence of hydrogen required as reducing agent in dehalogenation ($4H_2+SO_4^{2-} \rightarrow S^{2-}+4H_2O$), so that previous chemical removal of sulfide (e.g. by precipitation) would not be successful in this case.

DE 199 52 732 describes a process wherein a noble metal catalyst is enclosed in a hydrophobic polymer membrane to protect the catalyst against deactivation and erosion. Also familiar is embedding the metal component of the catalyst in a hydrophobic zeolite [C. Schüth, M. Reinhard, Applied Catal. B 18 (1997), 215-221]. Neither the polymer membrane nor the pore structure of the zeolite skeleton is capable of reliably protecting the noble metals against poisoning by free hydrogen sulfide, because the latter is as penetrating as the HHC to be removed. Previous removal of sulfide is not successful in this case, because the supplied hydrogen under anaerobic conditions will always be utilized by microorganisms to form sulfide, so that new sulfide is formed in the immediate vicinity of the catalyst, resulting in rapid deactivation of the catalyst.

One problem of catalytic hydrodehalogenation unresolved so far is that many saturated HHC undergo reaction only very slowly or even not at all at temperatures typical in groundwaters and wastewaters. However, a substantial increase of the reaction temperature in the aqueous phase is not justifiable for reasons relating to energy and associated cost. Similarly, the improved catalyst matrices described above are not capable of extending the insufficient effective range of noble metal catalysts for saturated HHC.

In heterogeneously catalyzed reactions in aqueous phase there is the fundamental problem that limited transport of the reactants prevents utilization of the full catalyst activity. In the pore system of a porous catalyst support or in a polymer membrane of a polymer-supported catalyst, mass transport solely proceeds via molecular diffusion. This is a relatively slow process ($D \approx 10^{-5}$ cm$^2$ s$^{-1}$) both in liquid phase and in polymer phase. In a rapid catalytic reaction, the pollutant molecules to be converted only reach the outer, marginal zone of the catalyst grain. Hence, the inner pore volume remains largely unused. To minimize this effect, it would be desirable to have grain dimensions as small as possible. However, this is opposed by the high flow resistance of a fine-grain fixed bed.

In principle, the use of catalysts in reductive dehalogenation of HHC in gaseous phase at elevated temperatures is well-known [for example, L. S. Vadlamannati, V. I. Kovalchuk, J. L. d'Itri, Cat. Lett. 58 (1999), 173-178; S. Deshmukh, J. L. d'Itri, Cat. Today 40 (1998), 377-385; Y. I. Matatov-Meytal, M. Sheintuch, Ind. Eng. Chem. Res. 39 (2000), 18-23; E.-J. Shin, M. A. Keane, Cat. Lett. 58 (1999), 141-145; C. Menini, C. Park, E. Shin, G. Tavoularis, M. A. Keane, Catalysis Today 62 (2000), 355-366]. The well-known processes dispose of or utilize HHC present as waste in concentrated form, or relate to the regeneration of HHC-loaded adsorbers. In contrast to the dry consistency of concentrated waste, an aqueous matrix has the effect that the streams of gas produced by stripping are obtained in wet condition. As a rule, this affects subsequent chemical treatment steps. To date, application in direct catalytic purification of streams of groundwater or wastewater is not possible.

SUMMARY OF THE INVENTION

The invention is therefore based on the object of developing a process and providing a device which allow complete utilization of the potential of catalysts in reductive dehalogenation of HHC, ensure stable activity of the catalyst over a long time of operation, and are applicable to a widest possible spectrum of various halogen compounds such as halogenated $C_1$ and $C_2$ compounds, particularly methylene chloride, bromoform, VC, DCE, TCE, tetrachloroethene (PCE), tetrachloroethanes (TeCE), as well as halogenated benzenes.

According to the invention, said object is accomplished by pre-treating the HHC in contaminated waters so as to convert low-volatility compounds into more readily volatile components and subsequently transferring the HHC from the aqueous phase to be purified to the gaseous phase, with successive catalytic reductive dehalogenation over suitable catalysts. The invention is accomplished by means of a process and a device according to claims 1 and 11. The respective subclaims represent preferred embodiments.

According to the invention, catalytic dehalogenation in gaseous phase can be performed at temperatures above ambient temperatures at high rate and selectivity. Preferred reaction temperatures are from 50° C. to 400° C., especially from 100° C. to 350° C. The preferred residence time ranges from 0.1 to 10 s, corresponding to a catalyst load W/F=360 to 36,000 v/vh in a stream of gas containing hydrogen, the proportion of hydrogen being from 0.1 to 99 vol.-%, preferably from 0.5 to 25 vol.-%, and more preferably from 1 to 10 vol.-%.

The transition from a contaminated water phase to a gaseous phase generates a "clean" working medium. Under such conditions, the effective reaction rate of most HHC is more than 100,000 times as high as in water at 15° C. on iron or more than 1000 times as high as in water at 15° C. on comparable supported catalysts. Simultaneously, the phase transition results in concentrating of HHC in the carrier medium, expressed as g of HHC per g of stripping gas compared to g of HHC per g of water, by a factor of $\geq 100$. As a result of such concentrating, heating of the stream of products to temperatures preferably above 100° C. becomes acceptable.

More specifically, metals of subgroup VIII on porous supports such as γ-aluminum oxide, alumosilicates, zeolites, silica gel etc. in pelletized form with a metal content of from 0.1 to 20 wt.-%, preferably from 0.5 to 2 wt.-%, are used as catalysts. In particular, palladium and nickel are used, with palladium being particularly preferred. While nickel also has high catalytic activity in said dehalogenation reaction, there is a loss in its hydrogenation activity in the presence of HHC, so that—as opposed to Pd catalysts—unsaturated reaction products are increasingly formed.

The process according to the invention also comprises stages of treatment in aqueous phase, effecting conversion of poorly strippable HHC into more easily strippable compounds, but this treatment does not involve the necessity of complete dehalogenation or detoxification.

Surprisingly, the presence of volatile sulfur compounds such as hydrogen sulfide was found to have a much lower inhibiting effect on the catalyst activity as compared to their effect when conducting the reaction in aqueous phase. Partial poisoning of the catalyst occurring in the gaseous phase is reversible, disappearing under normal reaction conditions within a few hours upon terminating the sulfur supply, optionally by treatment in a stream of hydrogen at elevated temperature ($\leq 400°$ C.), Deactivation of the catalyst as a result of fouling by biofilms or other biological phenomenons is excluded a priori, because the catalyst does not directly contact the water and the reaction conditions exclude biological activities. The same applies to deposition of inorganic precipitates on the catalyst surface, which frequently has been observed to be the cause of deactivation in aqueous phase.

The physical separation of catalyst and aqueous phase is also advantageous in that the metal component cannot be removed from the support, regardless of the pH value of the water and the presence of potential complexing agents. This would not only lead to a loss of activity but at the same time result in additional metal contamination of the water (e.g. by Ni).

Even in case of compounds with high chemical stability, such as methylene chloride, which do not undergo reductive dehalogenation in aqueous phase at all, the catalytic reductive dehalogenation proceeds rapidly and completely in gaseous phase at temperatures of $\leq 400°$ C., preferably $\leq 350°$ C., where residence times in the reactor of less than 10 s, usually below 1 s, are sufficient. The only products of complete dehalogenation of $C_1$ and $C_2$ HHC are methane, ethane and ethene which, in case of low mass flux, can be discharged into the atmosphere without secondary treatment, or, in case of high mass flux, can be combusted together with excess hydrogen without any problems. When using palladium as catalytically active metal, olefinic intermediate products will be completely hydrogenated, leaving methane and ethane as the only final products.

Unsaturated HHC such as VC and TCE undergo rapid and complete conversion even at low temperatures (<100° C.) on the catalysts employed, where hydrogenation of the unsaturated HHC takes place as side reaction. For example, ethyl chloride is predominantly formed from VC at 50° C. on Pd catalysts. From a toxicological view, such hydrogenation may already imply a significant reduction of potential hazards. It is nevertheless undesirable, because the saturated HHC being formed, e.g. ethyl chloride from VC, are more stable than the starting materials, requiring higher reaction temperatures for complete dehalogenation. Therefore, depending on the HHC to be eliminated, the reaction temperatures are conveniently adjusted to such a high level that the selectivity of the conversion is shifted towards hydrocarbons free of halogen. To this end, temperatures $\geq 100°$ C. (preferably $\geq 150°$ C.) are usually required on the Pd catalysts preferably used.

The diffusion coefficient of molecules in gaseous phase is about 3 magnitudes higher as compared to the aqueous phase, facilitating rapid transportation of reactants to and from the active centers of the catalyst and avoiding transport limitation of the reaction rate. In this way, catalytic centers within porous supports can also be utilized. As is well-known, the rate of most chemical reactions increases exponentially with temperature. A reaction conducted in gaseous phase at elevated temperatures (100 to 350° C.) therefore enables much higher reaction rates as compared to ambient temperature in aqueous phase (about 15° C. in case of groundwater). As a result, the amounts of catalyst required and the reactors receiving same can be dimensioned much smaller.

In general, the transition of volatile contaminants from an aqueous phase to a gaseous phase (stripping) proceeds in specially designed stripping columns, by means of which water and stripping gas are conducted in counterflow and caused to make intimate contact with each other. The vapor pressure $p_i$ of volatile compounds i to be removed is described by the Henry coefficient $K_{H,i}=p_i/c_{i\ in\ water}$. The magnitude of the Henry coefficient of the least volatile contaminant decisively determines the stripping gas-to-water quantity ratio required to achieve a specific degree of purification. Regarding air as stripping gas, which is available at virtually zero cost, this ratio is not critical. When regarding an inert stripping gas such as nitrogen, however, minimizing the stripping gas-to-water quantity ratio is a substantial efficiency factor. For this reason, stripping under reduced pressure is preferred in the process according to the invention. In this way, the stream of stripping gas to be provided and treated is minimized.

As a preferred and particularly artful stripping variant, it is possible to perform vacuum stripping using a hollow-fiber membrane module [A. A. Keller, B. G. Bierwagen, Environm. Sci. Technol. 35 (2001), 1875-1879]. In contrast to prior art stripping processes, the aqueous and gaseous phases do not make direct contact but flow past each other, separated by a thin, porous membrane having hydrophobic properties. Volatile organic compounds then permeate out of the aqueous phase and into the gaseous phase. The stripping gas has not more than a purge function, namely, to carry away the organic vapors. Such an arrangement allows reducing the pressure on the gas side (e.g. from 100 kPa down to 5 kPa) and thus, minimizing the above-mentioned quantity ratio without making concessions as to the degree of purification. At the same time, the amount of co-evaporating water is minimized as a result of the hydrophobic properties of the polymer membrane.

For catalytic secondary treatment of the stripping gas, it is particularly advantageous to arrange the reactor at the pressure side of the vacuum pump (cf., FIG. 1). This results in smaller gas volume flow and, as a consequence, in smaller dimensions of the apparatus. Low water content of the stripping gas is favorable for stable long-term operation of the dehalogenation catalyst. Owing to the hydrophobic membrane in the stripping module, an additional drying stage is unnecessary.

The purity that is required is a substantial factor in the cost of providing the stripping gas, e.g. nitrogen. More specifically, residual oxygen present competes with the hydrodehalogenation of HHC for available hydrogen according to: $2H_2+O_2\rightarrow 2H_2O$. Surprisingly, experiments with the Pd catalysts preferably used have shown that hydrodehalogenation of most HHC is more rapid than oxygen reduction at temperatures $\geq 100°$ C. In HHC-loaded stripping gases, it was possible to achieve complete hydrodehalogenation even in those cases where a stoichiometric deficiency of hydrogen with respect to the sum of HHC and $O_2$ was present.

Frequently, groundwaters contaminated with organic matter are entirely anaerobic, because oxygen originally present has been consumed by microbial activity. The entire water chemistry, particularly the Fe(II)/Fe(III) equilibrium, is accommodated to low redox potential. Contact with oxygen may give rise to precipitation difficult to control. One crucial advantage of the process according to the invention is that the water to be decontaminated can be maintained under anaerobic conditions during the entire treatment, and that all of the chemical reactions taking place are reduction reactions. Furthermore, this prevents reformation of partially halogenated and simultaneously partially oxidized intermediates with high potential of hazard, such as chlorinated acetic acids.

The volatility of organic compounds in aqueous solution is described by their Henry coefficient, the dimensionless form of which is defined by the equation $K_{H,i}=c_{i,\ gaseous\ phase}/c_{i,\ water}$, with $c_i$ (in g/l) being the concentration of component i in the gaseous phase and aqueous phase, respectively. In the event of HHC, $K_H$ may vary over a wide range, typically from 0.01 to 2 [J. Staudinger, P. V. Roberts, Crit. Rev. in Environm. Sci. Technol. 26 (1996), 205-297]. Contaminants having a small Henry coefficient can only be removed with high input of stripping gas or at elevated temperatures of the water. Both of the latter represent considerable economic drawbacks to this process. In order to make transition from the aqueous phase to the gaseous phase effective, HHC with a small Henry coefficient ($K_H<0.1$), while still in the aqueous phase, must be converted by chemical reaction into compounds with a Henry coefficient as high as possible. For example, HHC with low $K_H$ are 1,1,2,2-TeCE ($K_H=0.015$ at 20° C.), bromoform ($K_H=0.02$) and 1,1,2-trichloroethane ($K_H=0.03$).

According to the invention, such conversion is achieved by various process stages adapted to the specific physical problem. In contrast to treatment processes directed towards elimination of HHC to the largest possible extent, the point herein is to increase the volatility of the contaminants. 1,1,2,2-TeCE ($K_H=0.015$) can be converted into TCE ($K_H=0.4$) e.g. by hydrolysis in alkaline medium according to $C_2H_2Cl_4+OH^-\rightarrow C_2HCl_3+H_2O+Cl^-$. At a pH value of 11, hydrolysis proceeds with a half-life of $\leq 10$ minutes. TCE is not an acceptable final product of a decontamination. However, the volatility of a particular HHC to be removed is increased by a factor of 27 and, according to the invention, the HHC is therefore made much more readily available to gas-phase treatment.

One alternative to alkaline hydrolysis is reductive dehalogenation in aqueous phase on metallic iron. All of the above-mentioned low-volatility HHC feature high reaction rates on iron surfaces [M. M. Scherer, B. A. Balko, D. A. Gallagher, P. A. Tratnyek, Environ. Sci. Technol. 32 (1998), 3026-3033; T. L. Johnson, M. M. Scherer, P. A. Tratnyek, Environ. Sci. Technol. 30 (1996), 2634-2640], thereby allowing prior art conversion in an iron-packed fixed-bed reactor of justifiable dimensions. All of the reaction products (ethene, ethane, methane and partially dehalogenated HHC) are more readily volatile than the starting compounds, allowing easy removal thereof from the water in the membrane module and subsequent complete dehalogenation in the gas-phase reactor.

Some HHC react even more rapidly on metallic zinc as compared to metallic iron. 1,1,2,2-TeCE, which has particularly low volatility, has a reaction rate per unit surface area on zinc which is about 3 magnitudes higher than that on iron [W. A. Arnold, W. P. Ball, A. L. Roberts, J. Contam. Hydrol. 40 (1999), 183-200]. However, rapid dehalogenation does not go beyond the 1,2-dichloroethene stage, thus appearing less attractive in prior art decontamination processes. Dichloroethenes have much higher volatility ($K_H$=0.35 and 0.15 for cis- and trans-1,2-DCE, respectively) compared to the starting compounds. Zinc that dissolves in the dehalogenation reaction is not tolerable for a purified water and can be removed almost completely e.g. by single passage through a downstream iron bed.

The last-mentioned three examples make clear in which way the inventive process combination of stripping plus catalytic gas-phase dehalogenation extends the scope for upstream conversions of materials.

The process according to the invention utilizes the well-known effect of exponentially increasing reaction rate with increasing temperature. Heating a stream of products is an energy-intensive step decisively determining the economy of a particular process. Thus, heating the water to be treated from 15 to 150° C., including evaporation of the water, would require an employed energy of at least 2500 MJ/m³. According to the present process, a stream of gas of 3 m³ nitrogen per m³ of water, for example, which includes the entire load of pollutants, is heated to about 150° C. The amount of energy required to this end is only about 0.16 MJ, i.e., less than 0.1% of the energy required in direct heating of the water to the same reaction temperature. It is clear from this comparison what an enormous gain in efficiency is possible when transferring the HHC from the aqueous phase to the gaseous phase.

Despite higher sulfur resistance of dehalogenation catalysts in the gaseous phase compared to the aqueous phase, sulfur compounds are strong catalyst poisons, whose contact with the catalyst must be prevented to the largest possible extent. Zinc oxide is known to be a highly effective $H_2S$ absorber. In the process according to the invention, ZnO is optionally used as absorber in the gaseous phase rather than in the aqueous phase. Thus, in analogy to the metal components of the catalyst (e.g. Ni or Pd), introduction of zinc into the aqueous phase is excluded. To be sure of this fact is another advantage inherent in the process according to the invention.

BRIEF DESCRIPTION OF THE DRAWING

The invention is also directed to a device for performing the process according to the invention.

DETAILED DESCRIPTION OF THE INVENTION

Figure 1:
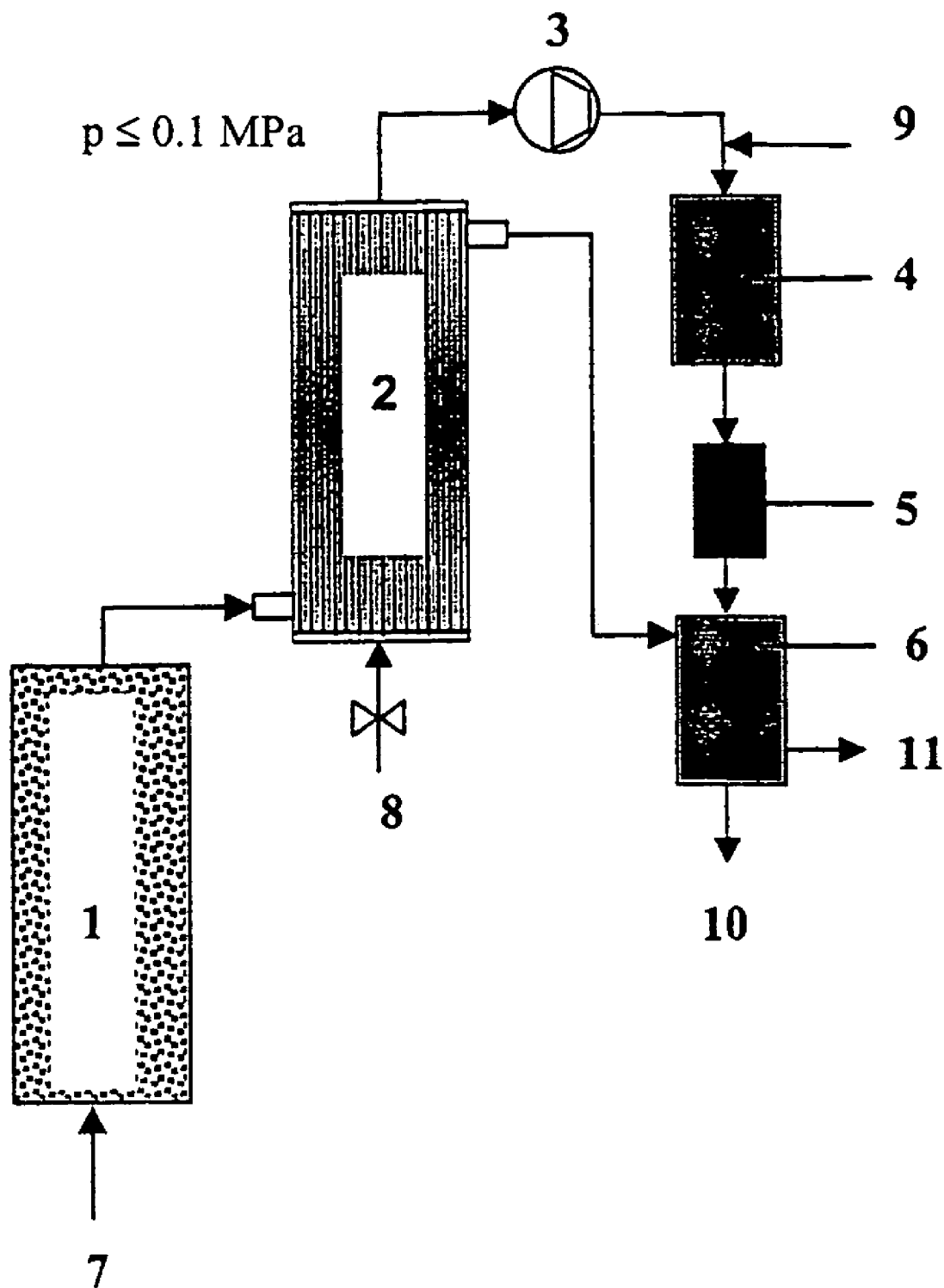
FIG. 1 illustrates the device which has the following configuration:
The device of the invention for decontaminating waters, especially groundwaters, which are heavily and complexly polluted with HHC, comprises at least one pre-treatment chamber 1, a stripping apparatus 2, a vacuum pump 3, a dehalogenation reactor 5 including heater and catalyst, and a hydrogen halide (HX) scrubber 6, a contaminated water feed line 7, a stripping gas feed line 8, effluent lines 10, 11 for purified stripping gas and decontaminated water, respectively, a hydrogen feed line 9, and an optional absorber 4.

In a preferred embodiment of the device, the pre-treatment chamber is comprised of a cascade of from 2 to 10 containers connected in series, allowing a total residence time of the water of preferably 10 minutes to 2 hours, and having suitable means for metering liquid chemicals at the inlet thereof. More specifically, these are alkaline solutions.

The pre-treatment chamber can be filled with granulated iron having a particle size between 1 and 20 mm and a specific surface area of from 50 to 5000 m²/kg or with granulated zinc having a particle size between 1 and 20 mm and a specific surface area of from 10 to 1000 m²/kg. Each specific surface area is determined using the BET method.

In another embodiment, the pre-treatment chamber consists of several sections filled with iron and zinc beds, an iron bed always being located at the end of the chamber.

The stripping apparatus is preferably a hollow-fiber membrane module wherein the water to be purified and the stream of stripping gas, separated by a thin, porous membrane having hydrophobic properties, flow past each other in a countercurrent or cross current.

The vacuum pump is preferably dimensioned in such a way that a final pressure of 10 kPa can be maintained even at high gas flow.

The dehalogenation reactor is equipped with a heater which ensures heating of the stream of stripping gas at temperatures up to 400° C. prior to initial contact between gas and catalyst, and is filled with a bed including the catalyst, preferably palladium, on a porous support in pelletized form.

The device preferably operates according to the following exemplary process scheme:
a) The pre-treatment chamber 1 is packed with metallic iron, for example. The iron assumes three functions: conversion of low-volatility HHC into more easily strippable compounds; generation of hydrogen via corrosion; and optionally, binding of sulfur compounds, particularly sulfides. The iron is employed in the form of a granulate, preferably with a porosity of from 0.3 to 0.7 and a specific surface area of from 500 to 2000 m²/kg. As set forth above, other reagents such as zinc can be introduced as an alternative or in addition to the iron packing. As a result of designing the pre-treatment chamber in the form of a cascade having up to 10 containers connected in series, a long residence time of the water to be pre-treated is achieved, simultaneously ensuring low back-mixing.
b) Stripping apparatus 2. In this apparatus, volatile components of the water are removed from the aqueous phase in a countercurrent using a stream of stripping gas which can be under reduced pressure. The stripping apparatus can be a vacuum stripping column or preferably a hollow-fiber membrane module.
c) The optional absorber 4, which includes e.g. ZnO, assumes the function of absorbing any stripped sulfur compounds, particularly hydrogen sulfide, so as to reliably prevent deactivation of the catalyst.

d) The dehalogenation reactor 5 is the central part of the process. Therein, the stripped HHC are completely dehalogenated at elevated temperature over a catalyst fixed bed in the presence of hydrogen.

e) In the hydrogen halide (HX) scrubber 6, the stream of reaction gas containing HX is scrubbed with decontaminated process water so as to completely remove the hydrogen halide from the reaction gas. This reduces the pH value of the stream of water which has alkaline reaction downstream of the (iron) reactor.

In summary, it is to be noted:

The invention relates to a process and a device for the decontamination of waters, especially groundwaters, which are heavily and complexly polluted with organic halogen compounds (HHC). According to the invention, the decontamination is carried out both in aqueous phase and in gaseous phase. The pre-treatment in aqueous phase, e.g. by hydrolysis or reductive dehalogenation on metals, is directed towards conversion of low-volatility compounds into more readily volatile, more easily strippable compounds. In order to transfer the HHC to the gaseous phase, the aqueous phase is stripped with a stream of inert gas, said operation preferably being effected under reduced pressure, and a membrane module with indirect contact between the two phases being used. The HHC are concentrated in the gaseous phase and cleaved into halogen-free hydrocarbons and hydrogen halides by reductive dehalogenation with hydrogen at elevated temperatures using a catalyst, preferably palladium, on porous supports.

Key to FIG. 1:
1 Pre-treatment chamber
2 Stripping apparatus
3 Vacuum pump
4 Absorber
5 Dehalogenation reactor with heater and catalyst
6 HX scrubber
7 Feed line for contaminated water and optional chemicals
8 Stripping gas feed line
9 Hydrogen feed line
10 Effluent line for purified stripping gas
11 Effluent line for decontaminated water

DETAILED DESCRIPTION OF THE INVENTION

Without intending to be limiting, the invention will be illustrated in more detail with reference to the examples below.

EXAMPLES

The process according to the invention has been tested extensively in all essential procedures and reactions in a series of batch and column experiments on a laboratory scale.

Example 1

Generation of Hydrogen in a Fixed Bed of Iron Granulate

In column tests, a technically available, macroporous iron batch (3-5 mm particle diameter, 800 m$^2$/kg BET surface area) was run with CHC-contaminated groundwater for several weeks (water throughput 1000 pore volumes) until a steady state was reached. The approximately constant rate of hydrogen formation measured in the 4$^{th}$ week of operation was about 0.5 l/kg$_{Fe}$·d. The column effluent had a pH value of 6.8 to 7.5.

An assumed contamination of 20 mg/l TeCE requires about 11.4 l of H$_2$ per m$^3$ of groundwater for complete hydrodechlorination according to the reaction equation C$_2$H$_2$Cl$_4$+4H$_2$→C$_2$H$_6$+4HCl. The bulk density of iron in a fixed-bed reactor is about 3.5 kg/l. A maximum throughput of 156 m$^3$ of groundwater per m$^3$ iron-packed reactor volume and day (=6.5 v/vh) follows from these data, if the amount of hydrogen generated by iron corrosion is to cover precisely the stoichiometric demand of dechlorination.

Pre-treatment of the groundwater, where e.g. TeCE is converted into TCE by hydrolysis, would not change anything in this calculation, because hydrogenation of the double bond consumes just as much hydrogen as hydrogenolysis of a C—Cl bond.

Where the throughput of groundwater to be treated is selected to be higher, additional feeding of external hydrogen into the stripping gas upstream of the membrane module or upstream of the catalyst is possible without any problems.

Under the conditions specified above, the hydrogen generated in situ is completely soluble in the groundwater (S$_{H2}$≈20 l/m$^3$ at 15° C., and p$_{H2}$=0.1 MPa). In those cases, however, where further gases dissolved in the groundwater (e.g. nitrogen and carbon dioxide) increase the overall vapor pressure above ambient pressure, spontaneous degassing of the water may occur. Irrespective of whether the hydrogen generated by iron corrosion reaches the stripping module in dissolved form or as a gas bubble, it is utterly available to the catalytic dehalogenation. In principle, dissolved gases or gases suspended in the form of bubbles promote the HHC stripping process.

Example 2

Dehalogenation in Aqueous Phase 1 g of a commercially available Pd catalyst (0.5 wt.-% Pd on γ-Al$_2$O$_3$) in pelletized form (d$_{pellet}$ about 2-3 mm) was added to 1 l of a hydrogen-saturated solution of HHC (CH$_2$Cl$_2$, CCl$_4$, bromoform, VC, TCE, PCE, 1,1,2,2-TeCE, chlorobenzene, 5 mg/l each time) in drinking-water. The solution was agitated at 15° C. overnight. The following compounds were detected by gas-chromatographic analysis: methane, ethene, ethane (none quantified), CH$_2$Cl$_2$ (5 mg/l), CHCl$_3$ (0.5 mg/l), TeCE (4 mg/l), and benzene (3.5 mg/l). The analysis demonstrates that the majority of the HHC had undergone complete dehalogenation. CCl$_4$ reacts both in one go to form methane and by stepwise dechlorination to form chloroform which in turn undergoes further dechlorination at a much slower rate. Methylene chloride does not react under these conditions, TeCE only very slowly.

In a second test, the drinking-water was replaced by original groundwater from a highly contaminated location, the sulfide content of which was about 1.5 mg/l. Analysis of added HHC after 16 hours and 48 hours reaction time did not show any measurable conversion, with the exception of CCl$_4$ (20% decrease). Apparently, the Pd catalyst had been poisoned rapidly.

Example 3

Dehalogenation in Gaseous Phase

A stream of gas (50 ml/min) comprised of 95 vol.-% N$_2$, 4.5 vol.-% H$_2$ and 0.5 vol.-% O$_2$ was passed at 15° C.

through the drinking-water (≧5 l stock) described in Example 2 and spiked with a HHC cocktail. The stream of gas loaded with water vapor and HHC according to their particular vapor pressures was passed over the Pd catalyst used in Example 2 (100 mg, particle diameter <1 mm, tube reactor with 4 mm inner diameter) at a temperature of 250° C. The reactor load was about 30,000 v/vh. The stripping gas was subjected to gas-chromatographic analysis upstream and downstream of the dehalogenation reactor. The main products were methane, ethane, benzene and cyclohexane. In addition, traces of methylene chloride and ethyl chloride were detected. It was possible to operate the reactor for several days without notable loss of activity under these conditions (with secondary metering of stripped HHC into the aqueous phase). At a reactor temperature of 150° C., the outlet concentrations of methylene chloride and TeCE, respectively, rose to about 50% and 10% of their reactor inlet values. Furthermore, there were traces of dichloroethane, and the concentration of ethyl chloride increased (presumably hydrogenation product of VC). All the other HHC still were completely reacted even under these milder reaction conditions.

After one week, the drinking-water was replaced by an original groundwater from a highly contaminated location, spiked with the same HHC cocktail. The catalyst activity continuously decreased during the next hours of operation at 150° C. After 4 hours of operation, an approximately steady state was reached, where conversion of the least reactive HHC($CH_2Cl_2$ and TeCE) was low (≦30%) and even the more reactive HHC could be detected at the reactor outlet.

At this point, the stripping process was interrupted, the pure stripping gas was passed directly on the dehalogenation reactor, and the temperature thereof was increased to 350° C. After 8 hours the original reaction conditions were re-adjusted (150° C., stream of stripping gas through spiked drinking-water). The catalyst showed the same dehalogenation activity as before contact with sulfurous gases.

Prior to re-switching the stripping apparatus to contaminated groundwater, an adsorber cartridge filled with 100 mg of powdered zinc oxide (ZnO) was placed between stripping apparatus and reactor. Following a short retardation phase during which the stripped HHC were retained on the ZnO, dehalogenation thereof was further monitored. Over an operation period of more than one week, the catalyst showed stable activity on a high level, comparable to that when using drinking-water as HHC source.

Example 4

Use of a Hollow-fiber Membrane Module in Stripping

A hollow-fiber membrane module from Celgard Inc. with an exchange surface of 0.5 m² (capillary diameter 0.25 mm, capillary wall thickness 0.03 mm, capillary material PP) was used in the laboratory experiments. Groundwater from a contaminated location, containing CHC (inter alia, VC, trans- and cis-DCE, TCE, PCE, 1,1,2,2-TeCE) at an overall concentration of about 50 mg/l, was pumped at 15° C. through the outer cover of the membrane module at a flow rate of 50 ml/min. Simultaneously, a stream of nitrogen of 150 Nml/min was drawn in by a vacuum pump on the capillary side (inside) in countercurrent relative to the groundwater. The gas side of the membrane module was adjusted to a constant operation pressure of about 10 kPa using two throttle valves. Subsequent to adjusting a stable test regime (about 60 min), the groundwater inflow and outflow were sampled using head-space GC analyses. The residual concentrations of CHC at the outlet of the stripping module, standardized to their inlet values, i.e., $c_{outlet}/c_{inlet}$, were <0.001 for VC and DCE, 0.003 for TCE and PCE, and 0.008 for 1,1,2,2-TeCE. The stripping efficiency under these conditions ($V_{gas}/V_{water}$=3) was more than 99% for all CHC under investigation.

The invention claimed is:

1. A process for decontaminating water polluted with halogenated hydrocarbon compounds (HHC), comprising
    pre-treating water contaminated with HHC, wherein said pretreatment converts low-volatility HHC compounds into more volatile HHC compounds,
    transferring the HHC from the aqueous phase to the gaseous phase at ambient temperature, and
    dehalogenating the gaseous phase HHC using catalytic reductive dehalogenation at a temperature between 50 degrees Celsius and 400 degrees Celsius.

2. The process according to claim 1, wherein said pretreatment is selected from the group consisting of alkaline hydrolysis and reductive dehalogenation using iron, zinc, or a combination thereof.

3. The process according to claim 1, wherein the transferring step comprises stripping with an inert gas under reduced pressure.

4. The process according to claim 1, wherein the transferring step comprises indirect stripping of the HHC using in a hollow-fiber membrane module, wherein mass transfer between the aqueous and gaseous phases is mediated by a hydrophobic membrane.

5. The process according to claim 1, wherein a catalyst for the catalytic reductive halogenation comprises between 0.1% and 20% by mass of a metal selected from the group consisting of nickel, palladium, and platinum, disposed on a porous support.

6. The process according to claim 1, wherein the dehalogenating step takes place at temperatures between 100 and 350 degrees Celsius.

7. The process according to claim 1, wherein a dehalogenating step catalyst has a catalyst load between 360 and 36,000 v/vh, wherein the gaseous phase HHC contans from 0.1 to 99 vol.-% hydrogen.

8. The process according to claim 1, further comprising, passing said gaseous phase HHC over an absorber prior to the catalytic dehalogenation.

9. The process according to claim 8, wherein an active component in the absorber comprises zinc oxide.

10. A device for decontaminating water polluted with HHC, by a process comprising pre-treating the HCC contaminated water, transferring the HHC from the aqueous phase to the gaseous phase at ambient temperature, and dehalogenating the gaseous phase HHC using catalytic reductive dehalogenation at a temperature between 50 degrees Celsius and 400 degrees Celsius, wherein said device comprises:
    at least one pre-treatment chamber comprised of a cascade of from 2 to 10 containers connected in series and having suitable means for metering liquid chemicals at the inlet thereof,
    a stripping apparatus downstream of said pre-treatment chamber,
    a vacuum pump downstream of said stripping apparatus,
    a dehalogenation reactor including heater and catalyst downstream of said vacuum pump,
    a hydrogen halide scrubber downstream of said dehalogenation reactor, a contaminated water feed line for introducing contaminated water into said at least one pre-treatment chamber, a stripping gas feed line for feeding stripping gas to said stripping apparatus, and separate effluent lines in communication with said hydrogen halide scrubber for purified stripping gas and decontaminated water.

11. The device according to claim 10, wherein the pre-treatment chamber is filled with granulated iron having a particle size between 1 and 20 mm and a specific surface area of from 50 to 5000 $m^2/kg$.

12. The device according to claim 10, wherein the pre-treatment chamber is filled with granulated zinc having a particle size between 1 and 20 mm and a specific surface area of from 10 to 1000 $m^2/kg$.

13. The device according to claim 10, wherein each of the 2 to 10 containers in the pre-treatment chamber is filled with a bed of iron and zinc, wherein a pre-treatment chamber outlet is in communication with a container filled with an iron bed.

14. The device according to claim 10, wherein the stripping apparatus is a hollow-fiber membrane module.

15. The device according to claim 14, wherein the vacuum pump maintains a stripping apparatus gas pressure of 10 kPa.

16. The device according to claim 10, wherein the dehalogenation reactor comprises a heater and the dehalogenation reactor contains a bed of a pelletized catalyst comprising between 0.1% and 20% by mass of a metal selected from the group consisting of nickel, palladium, and platinum, disposed on a porous support.

17. The device according to claim 10, further comprising a feed line for metering hydrogen to the gaseous phase HHC stream.

18. The device according to claim 10, further comprising an absorber upstream of the dehalogenation reactor.

19. The process according to claim 5, wherein the mass proportion of the metal disposed on the porous support is between 0.5 and 2%.

20. The process according to claim 7, wherein the gaseous phase HHC comprises from 0.5 to 25 vol-% hydrogen.

* * * * *